(12) United States Patent
Kurth

(10) Patent No.: US 7,658,872 B2
(45) Date of Patent: Feb. 9, 2010

(54) PROCESS FOR PREPARING SEMIPERMEABLE MEMBRANES HAVING IMPROVED PERMEABILITY

(75) Inventor: Christopher J. Kurth, Chaska, MN (US)

(73) Assignee: GE Osmonics, Inc., Minnetonka, MN (US)

( * ) Notice: Subject to any disclaimer, the term of this patent is extended or adjusted under 35 U.S.C. 154(b) by 609 days.

(21) Appl. No.: 10/506,135

(22) PCT Filed: Mar. 3, 2003

(86) PCT No.: PCT/US03/06587

§ 371 (c)(1),
(2), (4) Date: Dec. 8, 2004

(87) PCT Pub. No.: WO03/074152

PCT Pub. Date: Sep. 12, 2003

(65) Prior Publication Data

US 2005/0103705 A1 May 19, 2005

Related U.S. Application Data

(60) Provisional application No. 60/360,696, filed on Mar. 1, 2002.

(51) Int. Cl.
*B01D 67/00* (2006.01)
*B01D 71/06* (2006.01)
*B01D 29/46* (2006.01)

(52) U.S. Cl. ............................. 264/48; 264/41; 264/49; 210/500.27; 210/490; 210/500.38

(58) Field of Classification Search .................. 210/500.27–500.38, 652, 490; 264/48, 49, 264/41

See application file for complete search history.

(56) References Cited

U.S. PATENT DOCUMENTS

| 3,744,642 A | 7/1973 | Scala et al. ................ 210/500 |
| 3,855,122 A * | 12/1974 | Bourganel .................. 210/638 |
| 4,005,012 A * | 1/1977 | Wrasidlo .................... 210/654 |
| 4,256,108 A | 3/1981 | Theeuwes ................... 128/260 |
| 4,277,344 A | 7/1981 | Cadotte ...................... 210/654 |
| 4,292,417 A | 9/1981 | Ishii et al. .................. 525/510 |
| 4,377,654 A | 3/1983 | Haas et al. .................. 524/236 |
| 4,619,767 A | 10/1986 | Kamiyama et al. .......... 210/490 |
| 4,765,897 A | 8/1988 | Cadotte et al. ......... 210/500.23 |
| 4,783,346 A * | 11/1988 | Sundet ....................... 427/244 |
| 4,812,270 A | 3/1989 | Cadotte et al. ................ 264/48 |
| 4,830,885 A | 5/1989 | Tran et al. ................... 427/245 |
| 4,948,507 A | 8/1990 | Tomaschke ............ 210/500.38 |
| 4,983,291 A | 1/1991 | Chau et al. .................. 210/490 |
| 5,152,901 A * | 10/1992 | Hodgdon .................... 210/654 |
| 5,582,725 A * | 12/1996 | McCray et al. ............. 210/490 |
| 5,658,460 A * | 8/1997 | Cadotte et al. ......... 210/500.38 |
| 5,733,602 A | 3/1998 | Hirose et al. ................ 427/245 |
| 5,755,964 A * | 5/1998 | Mickols .................. 210/500.37 |
| 6,245,234 B1 | 6/2001 | Koo et al. .................. 210/500 |
| 6,368,507 B1 | 4/2002 | Koo et al. ............. 210/500.38 |
| 6,913,694 B2 * | 7/2005 | Koo et al. ............. 210/500.38 |

FOREIGN PATENT DOCUMENTS

EP 0474370 * 3/1992

* cited by examiner

*Primary Examiner*—Ana M Fortuna
(74) *Attorney, Agent, or Firm*—Viksnins Harris & Padys PLLP

(57) ABSTRACT

The invention provides methods for preparing reverse osmosis membranes having improved permeability as well as membranes prepared by such methods.

21 Claims, No Drawings

PROCESS FOR PREPARING SEMIPERMEABLE MEMBRANES HAVING IMPROVED PERMEABILITY

PRIORITY OF THE INVENTION

This application is a U.S. National Stage Filing under 35 U.S.C. 371 from International Application No. PCT/US03/06587, filed Mar. 3, 2003 and published in English as WO 03/074152A1 on Sep. 12, 2003, which claims priority from U.S. Provisional Application No. 60/360,696, filed Mar. 1, 2002, which applications and publication are incorporated herein by reference.

BACKGROUND OF THE INVENTION

Various techniques are used for effecting separation using asymmetric or composite membranes including selective permeation, ultrafiltration and reverse osmosis. One example of reverse osmosis separation is a desalination process in which seawater, contaminated water, or brackish water is rendered potable. Desalination of such water is often necessary to provide large amounts of relatively nonsalty water for industrial, agricultural, or home use. Such desalination can be effected by forcing water through a reverse osmosis membrane which retains the contaminants or salts. Typical reverse osmosis membranes have a very high salt rejection coefficient and possess the ability to pass a relatively large amount of water through the membrane at relatively low pressures.

Various U.S. patents describe reverse osmosis membranes and supports that are useful in industrial processes. See for example: U.S. Pat. Nos. 4,830,885, 3,744,642, 4,277,344, and 4,619,767.

U.S. Pat. Nos. 4,765,897 and 4,812,270 discusses polyamide membranes that are reported to be useful for water softening applications. The membranes are prepared by treating a polyamide reverse osmosis membrane with a strong mineral acid followed by treatment with a rejection enhancing agent.

Subsequently, U.S. Pat. No. 4,983,291 reported semipermeable membranes that are subjected to treatment with acids or certain acid derivatives and dried to provide a membrane that maintains high flux with a concurrent rejection rate.

Despite the above disclosures, there remains a need for reverse osmosis membranes having useful flux and retention properties. In particular, there is a need for reverse osmosis membranes that possess improved flux characteristics while maintaining useful rejection characteristics.

SUMMARY OF THE INVENTION

Applicant has discovered a method for preparing semipermeable reverse osmosis membranes having improved flux properties. Accordingly, the invention provides a method for preparing a reverse osmosis membrane having improved flux properties comprising treating a starting reverse osmosis membrane with dipropylammonium nitrate, diisopropylethylammonium nitrate, triethylammonium nitrate, tetraethylammonium nitrate, diethylammonium nitrate or tetraethylammonium borate, or a mixture thereof (and optionally drying) to provide the reverse osmosis membrane having improved flux properties.

The invention also provides a method of improving the permeability of a reverse osmosis membrane comprising, treating a reverse osmosis with an aqueous solution of an organic nitrate or borate salt, drying; and optionally recovering the membrane.

The invention also provides a reverse osmosis membrane prepared by a method of the invention.

U.S. Pat. No. 4,983,291 reported that the flux of a membrane could be maintained following drying by treatment with an acid selected from the group consisting of hydroxypolycarboxylic acids, polyaminoalkylene polycarboxylic acids, sulfonic acids, amino acids, amino acid salts, amine salts of acids, polymeric acids and inorganic acids prior to drying. Applicant has discovered that treatment of reverse osmosis membranes with a specific set of ammonium salts, in particular those with nitrate and borate anions, provides membranes with significantly improved flux. Additionally, the treatments of the invention do not significantly detract from the salt rejecting properties of the membrane.

DETAILED DESCRIPTION OF THE INVENTION

Reverse Osmosis Membranes

Reverse osmosis membranes which can be treated according to the methods of the invention include the reaction product of polyacyl halides, polysulfonyl halides or polyisocyanates and polyamines or bisphenols. The reaction product is typically deposited within and/or on a porous support backing material.

Reverse osmosis membranes can be prepared using methods that are generally known in the art, for example using methods similar to those described in U.S. Pat. Nos. 3,744, 642; 4,277,344; 4,948,507; and 4,983,291. Such methods entail coating an aqueous solution of a polyamine or a bisphenol, and preferably a polyamine, on a porous support backing material. Thereafter, the surface of the coated support material is optionally freed of excess amine solution and is contacted with an organic solution of a polyacyl halide, polysulfonyl halide or polyisocyanate to provide the reverse osmosis membrane, which can be utilized as a starting material in the method of the invention. These membranes may further be dried from glycerin, or drying agents disclosed in aforementioned patents.

The porous support backing material typically comprises a polymeric material containing pore sizes which are of sufficient size to permit the passage of permeate therethrough, but are not large enough so as to interfere with the bridging over of the resulting ultrathin reverse osmosis membrane. Examples of porous support backing materials which may be used to prepare the desired membrane composite of the present invention will include such polymers as polysulfone, polycarbonate, microporous polypropylene, the various polyamides, polyimines, polyphenylene ether, various halogenated polymers such as polyvinylidine fluoride, etc.

The porous support backing material may be coated utilizing either a hand coating or continuous operation with an aqueous solution of monomeric polyamines or to render the resulting membrane more resistant to environmental attacks of monomeric secondary polyamines. These monomeric polyamines may comprise cyclic polyamines such as piperazine, etc.; substituted cyclic polyamines such as methyl piperazine, dimethyl piperazine, etc.; aromatic polyamines such as m-phenylenediamine, o-phenylenediamine, p-phenylenediamine, etc.; substituted aromatic polyamines such as chlorophenylenediamine, N,N'-dimethyl-1,3-phenylenediamine, etc.; multi-aromatic ring polyamines such as benzidine, etc.; substituted multi-aromatic ring polyamines such as 3,3'-dimethylbenzidene, 3,3'-dichlorobenzidine, etc.; or a mixture thereof depending on the separation requirements as well as the environmental stability requirements of the resulting membranes.

The solution which is utilized as the carrier for the aromatic polyamine will typically comprise water in which the aromatic polyamine will be present in an amount in the range of from about 0.1 to about 20% by weight of the solution and which will have a pH in the range of from about 7 to about 14. The pH may either be the natural pH of the amine solution, or may be afforded by the presence of a base. Some examples of these acceptors will include sodium hydroxide, potassium hydroxide, sodium carbonate, triethylamine, N,N'-dimethylpiperazine, etc. Other additives in the amine solution may include surfactants, amine salts (for example see U.S. Pat. No. 4,948,507), and/or solvents (for example see U.S. Pat. No. 5,733,602).

After coating the porous support backing material with the aqueous solution of the aromatic polyamine, the excess solution is optionally removed by suitable techniques. Following this, the coated support material is then contacted with an organic solvent solution of the aromatic polyacyl halide. Examples of aromatic polyacyl halides which may be employed will include di- or tricarboxylic acid halides such as trimesoyl chloride (1,3,5-benzene tricarboxylic acid chloride), isophthaloyl chloride, terephthaloyl chloride, trimesoyl bromide (1,3,5-benzene tricarboxylic acid bromide), isophthaloyl bromide, terephthaloyl bromide, trimesoyl iodide (1,3,5-benzene tricarboxylic acid iodide), isophthaloyl iodide, terephthaloyl iodide, as well as mixtures of di-tri, tri-tri carboxylic acid halides, that is, trimesoyl halide and the isomeric phthaloyl halides. Alternative reactants to the aromatic polyacyl halide include aromatic di or tri sulfonyl halides, aormatic di or tri isocyanates, aromatic di or tri chloroformates, or aromatic rings substituted with mixtures of the above substituents. The polyacyl halides may be substituted to render them more resistant to further environmental attack.

The organic solvents which are employed in the process of this invention will comprise those which are immiscible with water, immiscible or sparingly miscible with polyhydric compounds and may comprise paraffins such as n-pentane, n-hexane, n-heptane, cyclopentane, cyclohexane, methylcyclopentane, naphtha, Isopars, etc. or halogenated hydrocarbon such as the Freon series or class of halogenated solvents.

Treatment According to the Invention

According to the invention, a reverse osmosis membrane, for example a membrane prepared as described above, is exposed to dipropylammonium nitrate, diisopropylethylammonium nitrate, triethylammonium nitrate, tetraethylammonium nitrate, diethylammonium nitrate or tetraethylammonium borate, or a mixture thereof for a period of time ranging from about 1 second to about 24 hours. The exposure of the membrane is usually affected at temperatures ranging from ambient up to about 90° C. or more and preferably at a temperature in the range of from about 20° to about 40° C.

Following exposure of the membrane, it is dried at elevated temperature (up to about 170° C.) for a period of time ranging from about 30 seconds to about 2 hours or more in duration.

Membranes prepared according to the methods of the invention typically may have an organic nitrate or borate salt in or on the membrane. Accordingly, the invention provides a reverse osmosis membrane having improved permeability that has an organic nitrate or borate salt in or on the membrane and optionally in the pores of the porous support backing material. In one embodiment, the membrane has dipropylammonium nitrate, tetraethylammonium nitrate, diethylammonium nitrate, triethylammonium borate in or on the membrane.

The following examples are given for illustration and are not limiting.

EXAMPLE 1

A sample of dry Osmonics AK RO membrane was immersed in an aqueous solution of triethylammonium Nitrate (4% W/W) for 1 minute. Excess solution was allowed to drain and the membrane was then placed in an oven (100° C.) for 4 minutes. The treated membrane was placed in a reverse osmosis cell and tested at 50 psig against a feed solution comprising NaCl (500 ppm) in DI water. Permeability (measured as A value, which has the units of $10^{-5}$ $cm^3$/($cm^2$*sec*atm)) and percent passage were measured after one hour of operation. The membrane had a permeability of 26.1 and 7.7% passage.

COMPARATIVE EXAMPLE A

AK membrane tested without treatment had a permeability of 19.4 and 3% passage.

EXAMPLE 2

A membrane prepared as in example 1 but using tetraethylammonium in place of triethylammonium had a permeability of 27.4 and 3.4% passage.

EXAMPLE 3

A membrane prepared as in example 1 but using diisopropylethylammonium in place of triethylammonium had a permeability of 24.9 and 2.7% passage.

EXAMPLE 4

A membrane prepared as in example 1 but using dipropylammonium in place of triethylammonium had a permeability of 24.1 and 3.9% passage.

EXAMPLE 5

A membrane prepared as in example 1 but using tetraethylammonium borate in place of triethylammonium nitrate had a permeability of 25.6 and 4.4% passage.

EXAMPLE 6

The method of Example 1 was used to treat a sample of Osmonics AG RO membrane. The membrane had a permeability of 15.2 and 0.9% passage.

EXAMPLE 7

A membrane prepared as in Example 2, but 1% triethylamine was added to the neutral solution to obtain a pH of 12 in the treatment solution. The membrane had a permeability of 34.1 and 5.2% passage.

COMPARATIVE EXAMPLE B

AG membrane tested without treatment had a permeability of 11.4 and 0.9% passage

COMPARATIVE EXAMPLE C

A membrane prepared as in Example 1 but using tetramethylammonium in place of triethylammonium had a permeability of 13.8 and 2.0% passage.

COMPARATIVE EXAMPLE D

A membrane prepared as in Example 1 but using tetraethylammonium toluenesulfonate in place of triethylammonium nitrate had a permeability of 18.1 and 2.0% passage.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

I claim:

1. A method for preparing a reverse osmosis membrane having improved permeability comprising treating a starting reverse osmosis membrane with dipropylammonium nitrate, diisopropylethylammonium nitrate, triethylammonium nitrate, tetraethylammonium nitrate, diethylammonium nitrate or tetraethylammonium borate, or a mixture thereof and then drying to provide the reverse osmosis membrane having improved permeability.

2. The method of claim 1 wherein the starting reverse osmosis membrane is treated with dipropylammonium nitrate, diisopropylethylammonium nitrate, triethylammonium nitrate, tetraethylammonium nitrate, or diethylammonium nitrate or a mixture thereof.

3. The method of claim 1 further comprising preparing the starting reverse osmosis membrane by coating a porous support backing material with an aqueous solution of a polyamine, optionally removing excess solution, and contacting the coated porous support backing material with an organic solution of a polyacyl halide, polysulfonyl halide or polyisocyanate to provide the starting reverse osmosis membrane as a condensation reaction product.

4. The method of claim 3 wherein the polyamine is an aromatic di or tri amine or a mixture thereof.

5. The method of claim 3 wherein the polyamine is a meta-phenylene diamine.

6. The method of claim 3 wherein the polyacyl halide is an aromatic di or tri acid halide.

7. The method of claim 3 wherein the polyacyl halide is trimesoylchloride, isophthaloyl chloride, or a mixture thereof.

8. The method of claim 1 wherein the starting reverse osmosis membrane has been dried prior to the treating.

9. The method of claim 1 wherein the treating is carried out at a pH of greater than 7.

10. The method of claim 1 wherein the treating is carried out at a pH of greater than 8.

11. The method of claim 1 wherein the treating is carries out at a pH of greater than 10.

12. A method for preparing a reverse osmosis membrane having improved permeability comprising treating a starting reverse osmosis membrane with tetraethylammonium borate.

13. A method of improving the permeability of a reverse osmosis membrane comprising treating a reverse osmosis membrane with an aqueous solution of an organic nitrate or borate salt that comprises a nitrogen containing cation $(C_1\text{-}C_6\text{-alkyl})_n N^+ H_{(4-n)}$; wherein n is 2, 3, or 4, drying; and optionally recovering the membrane.

14. The method of claim 13 wherein each $C_1\text{-}C_6$ alkyl is branched or unbranched group having less than four carbons.

15. The method of claim 13 wherein each $C_6$ alkyl is the same.

16. The method of claim 13 wherein each $C_1\text{-}C_6$ alkyl is not the same.

17. The method of claim 13 wherein the organic nitrate or borate salt comprises more than one nitrogen containing cation.

18. The method of claim 13 wherein n is 2.

19. The method of claim 13 wherein n is 3.

20. The method of claim 13 wherein n is 4.

21. The method of claim 13 wherein the reverse osmosis membrane has been dried prior to treatment with the aqueous solution of organic nitrate or borate salt.

* * * * *